(No Model.)
L. E. DEAN.
CROSSCUT SAW.
No. 493,687. Patented Mar. 21, 1893.
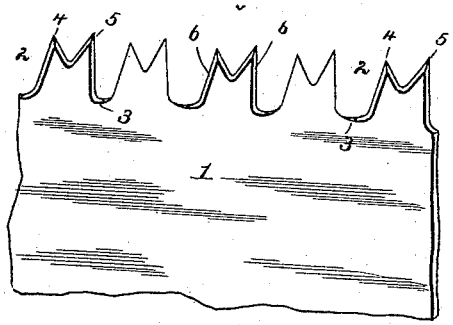
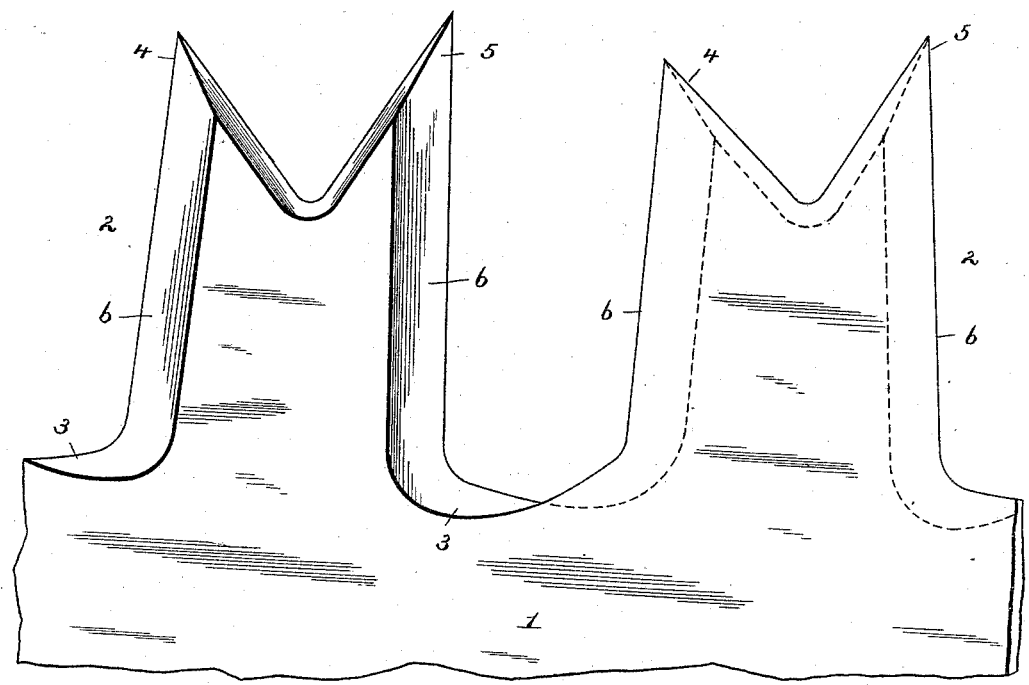
Witnesses
Harry L. Amer.
Chas. S. Hyer
Inventor
Lenard E. Dean.
By his Attorneys,
C. A. Snow & Co.

UNITED STATES PATENT OFFICE.

LENARD ELI DEAN, OF VANCOUVER, CANADA.

CROSSCUT-SAW.

SPECIFICATION forming part of Letters Patent No. 493,687, dated March 21, 1893.

Application filed October 10, 1892. Serial No. 448,388. (No model.)

*To all whom it may concern:*

Be it known that I, LENARD ELI DEAN, a subject of the Queen of Great Britain, residing at Vancouver, in the Province of British Columbia, Canada, have invented a new and useful Crosscut-Saw, of which the following is a specification.

This invention relates to certain new and useful improvements in cross-cut saws adapted to cut in both movements of the saw and having the teeth arranged in pairs and oppositely set with intervening throats, the object of the invention being to simplify the construction and arrangement of the parts of devices of this character and make them more positive in their action.

The invention consists of the construction and arrangement of the parts as will be more fully hereinafter described and claimed.

In the drawings:—Figure 1 is a perspective view of a portion of a saw blade embodying the improved construction. Fig. 2 is a similar view on an enlarged scale of two sets of the teeth broken away from the blade and particularly showing the manner of sharpening the same.

Similar numerals of reference are employed to indicate corresponding parts in the several figures.

Referring to the drawings, the numeral 1 designates a saw blade, which may be a hand saw, an ordinary form of cross-cut saw, a circular saw or a band saw having a series of teeth 2, formed therein intersected by throats 3, the said teeth being set in opposite directions as is well known in the art. Each of the teeth 2, is notched to form two smaller teeth 4 and 5, which are bent uniformly and together with the said teeth 2, when set. The teeth 4, are shorter than the teeth 5, in order that said teeth 5 may be projected, thereby giving each tooth 2, a leading cut and as said teeth 5, are in advance of teeth 4, said cut will be formed in advance of the clearing action of the said teeth 4. Each pair of teeth 4 and 5 are sharpened on alternate sides as at 6, as they progress by bevels which form said teeth pointed and the opposite side of each main tooth 2, is also beveled, the bevels in said main teeth 2, extending in opposite directions. The beveled side or end construction of the teeth 2, is also reversely arranged in alternation and by means of this form of sharpening the teeth, the saw is caused to cut in both directions of its movement. The construction as a whole is simple and effective by reason of this formation and it will be further seen that the bases of the throats 3, are also beveled alternately on reverse angles, thereby facilitating the clearing of the teeth of sawdust in both movements of the saw blade. The advantages of this construction will be readily apparent to those skilled in the art and need not be further enlarged upon herein.

Having thus described the invention, what is claimed as new is—

1. In a cross-cut saw, a blade having teeth with intersecting throats and notched to form smaller teeth arranged in pairs, one of each pair of said smaller teeth being longer than the other, substantially as described.

2. In a cross-cut saw, a blade having a series of teeth intersected by throats, the bases of the latter being beveled in opposite directions and said teeth being notched to form pairs of smaller teeth, one of each pair of said smaller teeth being longer than the other tooth and said teeth all sharpened alternately on reversed sides to provide double cutting edges, substantially as described.

In testimony that I claim the foregoing as my own I have hereto affixed my signature in the presence of two witnesses.

LENARD ELI DEAN.

Witnesses:
NORMAN MCCORMICK,
A. N. SMITH.